June 15, 1943.  H. S. BIMPSON ET AL  2,321,893
VAPOR SCRUBBING SYSTEM
Filed Aug. 3, 1940
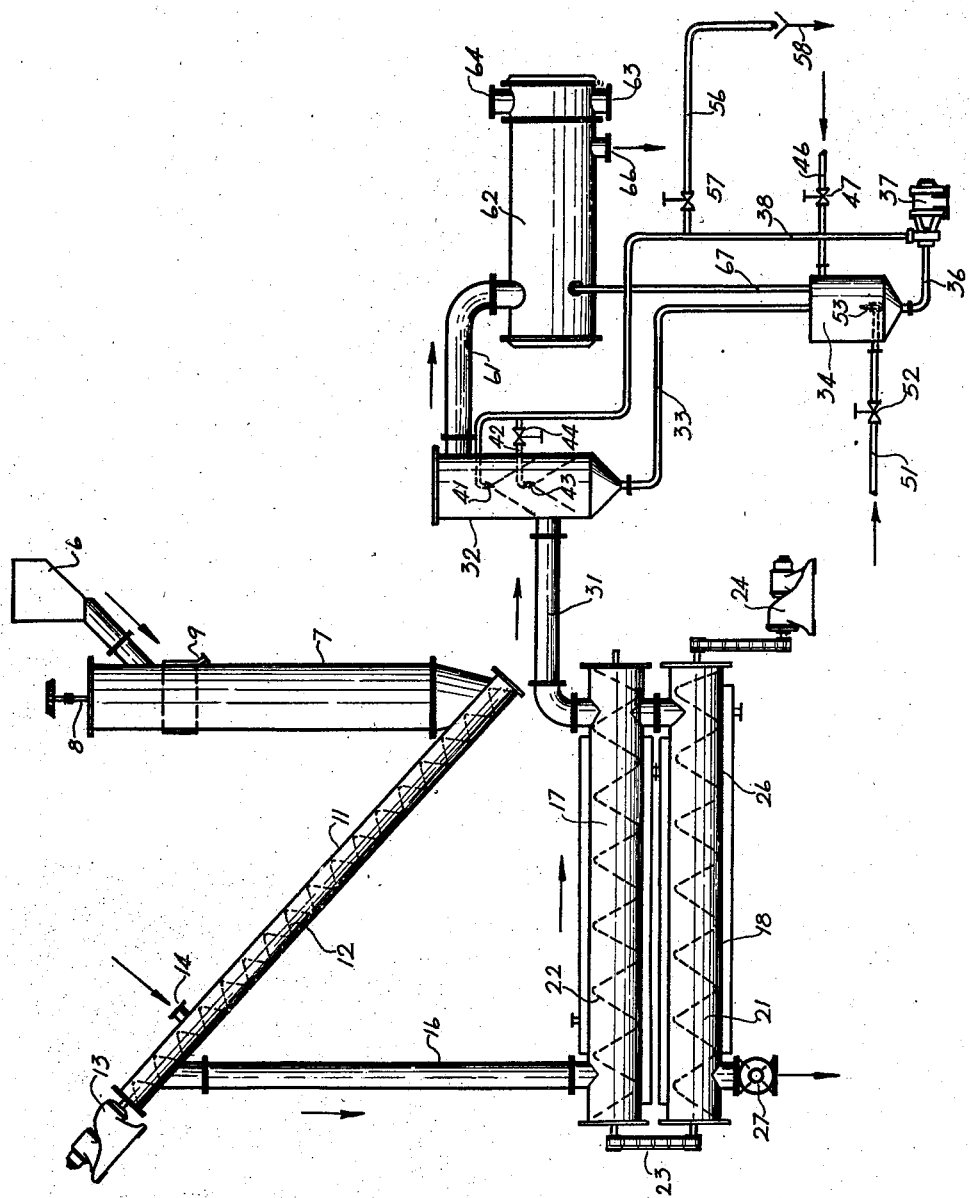
INVENTORS
H. S. Bimpson
C. W. Bilbe
BY G. J. DeWein
ATTORNEY Patented June 15, 1943

2,321,893

UNITED STATES PATENT OFFICE 2,321,893

VAPOR SCRUBBING SYSTEM

Henry S. Bimpson, West Allis, and Charles W. Bilbe, Wauwatosa, Wis., assignors to Allis-Chalmers Manufacturing Company, Milwaukee, Wis., a corporation of Delaware Application August 3, 1940, Serial No. 350,580

2 Claims. (Cl. 261—15)

This invention relates to improvements in the art of removing or scrubbing solids from gases and vapors and more particularly to scrubbing solids from gases and vapors which are condensable and are to be recovered by condensation.

In the operation of systems for extracting fats and oils from solid materials by means of solvents for such fats and oils, it is desirable to remove, as nearly as possible, all traces of solvent from the extracted solid to permit the use of the extracted solids for various purposes and to recover, as nearly as possible, all of the solvent used to permit reuse thereof. Removal of the vaporizable and condensable solvent from extracted solids requires that the solids, after the oil extracting process has been completed, be passed through closed drying equipment in which the solids are agitated at a temperature above the vaporization point of the solvent, thus producing evaporation of the solvent remaining in or on the solids. Such drying and agitating of the solids, however, produces a quantity of relatively fine dust which is carried with the current of solvent vapor rising from the dried solids and which must be removed from the solvent vapor to prevent such fouling of the means for condensing the solvent vapor as rapidly renders the condensing means ineffective. Heretofore, attempts were made to remove the dust from the vapor by changing the direction of flow or the velocity of flow or both the direction and velocity of the vapor stream, thus attempting to secure the precipitation of the dust without loss of the solvent vapor. Such attempts heretofore took the form of the insertion of large so-called plenum chambers between the driers and the condensers to change the direction of flow and to allow sudden expansion of the vapor, thus effecting a change in velocity. With the use of such chambers it was, however, found necessary to remove a sticky plastic precipitate from the condensers as frequently as every thirty-six hours of full capacity operation. It was also found that the solvent-water separating tanks employed in such systems received a very stable emulsion of solvent and water with fine dust in suspension, which emulsion collection continued until the water separating tank become completely filled. Such emulsion collection of course required removal and caused a material loss of solvent because of the fact that the emulsion had to be wasted to the sewer in which such emulsion was an extreme explosion hazard. Unless the water separating tanks are kept completely clear of said emulsion, a portion of the emulsion returns to the solvent storage tanks from which it is fed through the extracting system, thus materially reducing the efficiency of operation of the system. Efforts to employ the commercially known types of scrubbing equipment proved unsuccessful because of rapid fouling and such equipment had to be abandoned. However, equipment such as disclosed herein has been installed in ⁵⁄₇ of the present installations for extracting oil by the solvent method and proved entirely successful.

It is therefore among the objects of the present invention to provide scrubbing means for condensable vapors to permit the continuous operation of systems producing such vapors and the continuous condensation of such vapors.

Another object of the invention is to provide means for application to solvent method oil extraction installations for continuously removing dust from the solvent vapors to permit the continuous condensation thereof.

Another object of the invention is to provide means employing a liquid of higher boiling point than the solvent for precipitating dust from vapors occurring in the solvent method of oil extraction to facilitate the condensation of such vapors.

Another object of the invention is to provide water scrubbing means for condensing vapor from continuous oil extraction systems employing the solvent method in which the scrubbing water is heated to minimize vapor condensation in the scrubbing means and to prevent the formation of a solvent-water emulsion and is recirculated with continuous extraction of sludge and addition of make-up water to secure economy in the use of the water.

Objects and advantages other than those above set forth will be apparent from the following description when read in connection with the accompanying drawing which diagrammatically illustrates the application of the vapor scrubbing means of the present invention to the scrubbing of condensable vapors arising from the operation of systems for the extraction of oil by the solvent method in which the solvent is recovered for repeated reuse.

Referring to the drawing by characters of reference, reference numeral 6 designates a hopper to which oil bearing solid material is supplied after pretreatment thereof to place such material in its most readily extractable condition and from which such solids, hereinafter designated meal, are fed to an extraction device generally designated at 7. The extraction device 7 is shown as being in the form of a substantially cylindrical elongated tank or column provided with means mounted on a power driven shaft 8 to control and agitate the meal in its flow downwardly through the column. It will be understood that any one of several known suitable extracting devices may be used and that the present illustration of one of such known devices is made only for the purpose of illustrating the application of the present invention to a solvent method oil extraction system. The miscella or solution of oil in solvent is shown as being taken off the extraction column 7 at 9, by means of a suitable screen enlargement of the column. Meal flows downwardly through the extraction column 7 and is discharged therefrom into a lifting conveyor indicated at 11 and shown as producing lifting of the meal by means of screw 12 driven by a suitable drive such as a gear motor 13. Solvent is supplied to the extraction portion of the system by way of an inlet 14 to the conveyor at a point substantially on the horizontal level of the miscella take-off 9. It will be seen that the meal and solvent flow in countercurrent to each other, thus presenting partially extracted meal to progressively fresher solvent, as is well known in the art. It will be understood that the direction of flow through the extraction column and the conveyor depends on whether or not the meal is heavier or lighter than the solvent, it being assumed in the present instance that the meal sinks in the solvent.

The extracted meal is discharged from the conveyor 11 by way of a conduit 16 to a series of driers designated 17 and 18 and each of which may comprise a cylinder 21 containing a conveying means such as a screw 22, the several screws being preferably connected as by a spocket and chain connection 23 and driven by suitable means such as a gear motor 24 belted to one of the screws. The driers are double walled or jacketed as indicated at 26 for supply to the space defined by the jackets of fluid heating medium such as steam. Meal passes through the driers in series and is discharged from the last of the driers series by way of a vapor lock valve 27.

Solvent evaporated from the meal in passing through the driers, is taken off by way of a conduit 31 to a relatively large chamber 32, preferably in the form of a cylindrical tank with a conical bottom, the conduit 31 preferably entering the chamber 32 on a tangent to the wall thereof. The bottom of the chamber 32 is connected by way of a pipe 33 with the top of tank 34 having its bottom connected by a pipe 36 with the inlet of a motor driven pump 37. The discharge pipe 38 from the pump 37 extends into the chamber 32 and ends in expanding or spray nozzles 41, so located and of such character as to provide a finely divided spray substantially over the entire cross section of the chamber 32. A number of other connections 42 are also preferably made with the pipe 38 to supply additional spray nozzles 42 under the control of valves 44 to permit increase of the quantity of spray supplied to the chamber 32 whenever desired. Water is supplied to the collector tank 34 by a pipe 46 controlled by valve 47 and the entire contents of the tank 34 are heated and agitated by steam supplied through pipe 51 under the control of valve 52 to a nozzle 53 within the tank. A portion of the discharge from pump 37 is preferably continuously tapped off through a pipe 56 controlled by valve 57 and is discharged to waste or to a separate recovery system for the solids, as indicated at 58.

Vapor rising through the chamber 32 is taken by a conduit 61 to a suitable heat exchanging apparatus generally indicated at 62 which is cooled by a cooling medium supplied at an inlet 63 and discharged at 64. Vapor is condensed in and discharged from the heat exchanger at 66. Any solvent vapor passing through pipe 33 to tank 34 in any manner for any reason is revaporized or further vaporized in such tank by the action of steam flowing from the nozzle 53 and is vented to the heat exchanger 62 by pipe 67. In operation, meal passing through an extraction column 7 and conveyor 11 is necessarily somewhat ground up even though in a plastic condition due to its contact with the oil extraction solvent and, when such meal is thoroughly dried in driers 17, 18, the meal is further ground up due to its now non-plastic condition, thus producing relatively large quantities of fine dust. Solvent vapor condensing in the heat exchanger 62 produces a vacuum acting on the driers so that the vapor leaves the driers at a relatively high velocity and carries with it large quantities of dust. The dust laden vapor discharges into scrubber tank 32 where both the direction and velocity of the vapor flow are changed. Water is heated in the tank 34 by steam from the nozzle 53, above the vaporizing point of the solvent and is supplied under pressure to the nozzles 41, 43 which spray hot sludge into the scrubber tank 32 in such manner as to subject all portions of the rising vapor stream to such spraying that the hot spray vaporizes any solvent in or on the particles of dust carried by the vapor stream and wets such dust particles so that they then drop to the bottom of the scrubber tank 32 and then flow through the pipe 33 to the collection tank 34. Precipitated dust soon forms a sludge with the water in the tank 34 and is recirculated by pump 37 through the spray nozzles 41, 43, thus providing a sludge spray which is more effective than clear water in precipitating more dust. Continued precipitation of the dust would, however, soon produce a sludge too dense to spray properly. The density of the sludge is therefore controlled by continuously tapping off some sludge through pipe 56 and replacing the quantity tapped off by water through pipe 46 and valve 47 which may be automatically operated by a float in tank 34.

In actual practice it has been found that in installations using up to 60 G. P. M. spray water, the make-up water can be reduced to 3 to 6 G. P. M., thus saving approximately 2000 pounds per hour of heating steam (the quantity of steam producible by a boiler of approximately 60 H. P. capacity). The present invention has been found to permit the operation of extraction systems at higher than usual capacity with complete elimination of the frequent shut-downs formerly required for cleaning the heat exchangers and water separating tanks. It has eliminated the formation of an emulsion in the solvent-water loss and generally improved the operation of the system. The present invention therefore provides means for continuously scrubbing a condensable vapor without loss of any of such vapor and without interruption for cleaning purposes, of the desired continuous operation of extraction systems producing such vapors. It also permits the use of water for scrubbing without encountering the objections of loss of solvent, the formation of a solvent-water emulsion and the formation of plastic deposits reducing the efficiency of the equipment. Valuable byproducts are more readily recovered from a clean water solution and suspension thereof than an emulsion or mixture with water and solvent.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a system for cleaning condensable gases to be recovered, a tank free from internal obstructions to the flow of gases therethrough, a source of dust laden condensable gas, a conduit connecting said tank with said source to change the direction of flow and the velocity of the gas stream conducted to said tank, a spray nozzle for spraying water in the stream of gas passing through said tank to precipitate the dust therein, a tank for receiving the sludge of dust and water precipitated by the spray, means for heating the contents of said receiving tank above the evaporation temperature of the gas, and a pump connected to pump from said receiving tank to said spray nozzle.

2. In a system for cleaning condensable gases to be recovered, a tank free from internal obstructions to the flow of gases therethrough, a source of dust laden condensable gas, a conduit connecting said tank with said source to change the direction of flow and the velocity of the gas stream conducted to said tank, a heat exchanger for condensing the gas, a conduit connecting said tank with said heat exchanger to conduct the gas thereto, a closed tank for receiving the sludge of dust and water precipitating in the first said tank, means for heating and agitating the contents of said receiving tank above the evaporation temperature of the gas and to maintain intermixture of the contents thereof, a pipe venting condensable gases from said receiving tank to said heat exchanger, a spray nozzle for spraying water into the stream of gas passing through the first said tank to precipitate the dust therein without condensing the gas, and a pump connected to pump from said receiving tank to said spray nozzle.

HENRY S. BIMPSON.
CHARLES W. BILBE.